United States Patent [19]

Gaudreau

[11] Patent Number: 5,117,549

[45] Date of Patent: Jun. 2, 1992

[54] AUTOMOTIVE DOOR PANELS AND METHOD OF ASSEMBLY THEREFOR

[75] Inventor: Laurent R. Gaudreau, South Berwick, Me.

[73] Assignee: Davidson Textron Inc., Dover, N.H.

[21] Appl. No.: 682,686

[22] Filed: Apr. 9, 1991

Related U.S. Application Data

[63] Continuation of Ser. No. 312,483, Feb. 21, 1989, abandoned.

[51] Int. Cl.⁵ .............................................. B23P 25/00
[52] U.S. Cl. ........................................ 29/458; 29/469; 29/453; 29/897.2; 296/146
[58] Field of Search ................. 29/453, 463, 458, 469, 29/525.1, 466, 789, 790, 525, 430, 897.2; 49/501, 502; 296/39.1, 146; 52/208, 511

[56] References Cited

U.S. PATENT DOCUMENTS

| | | | |
|---|---|---|---|
| 4,488,745 | 12/1984 | Stokes | 293/155 |
| 4,587,703 | 5/1986 | Azizi et al. | 29/790 X |
| 4,651,470 | 3/1987 | Imura et al. | 49/502 |
| 4,704,822 | 11/1987 | Srock et al. | 49/502 |
| 4,776,739 | 10/1988 | Hamman | 411/510 |
| 4,848,829 | 7/1989 | Kidd | 296/39.1 X |

Primary Examiner—Joseph M. Gorski
Assistant Examiner—S. Thomas Hughes
Attorney, Agent, or Firm—Reising, Ethington, Barnard, Perry & Milton

[57] ABSTRACT

An improved interior automotive door panel assembly including integrally molded fasteners adapted to being connected to openings formed in the outer metal door structure. In an alternate embodiment the interior door panel assembly including the integrally molded fasteners has a bezel detachably mounted on the fasteners thereof by the interior door panel assembly supplier. The bezel is adapted to being automatically adhesively secured to the metal door assembly along the vehicle assembly line by the vehicle manufacturer. The interior door panel and fasteners may be subsequently removed from the bezel in the field.

1 Claim, 1 Drawing Sheet

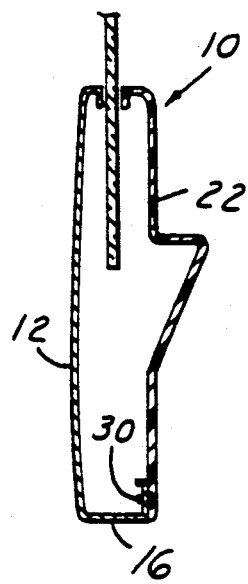
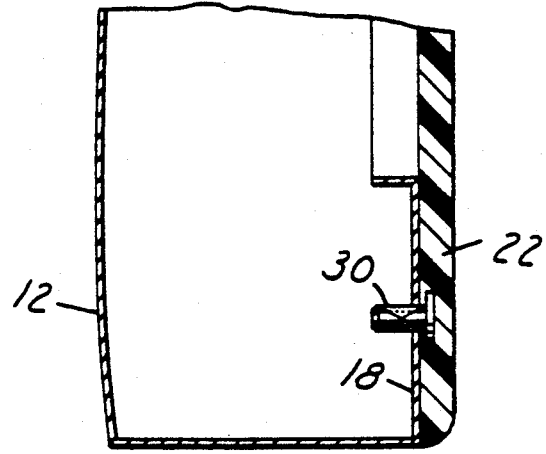
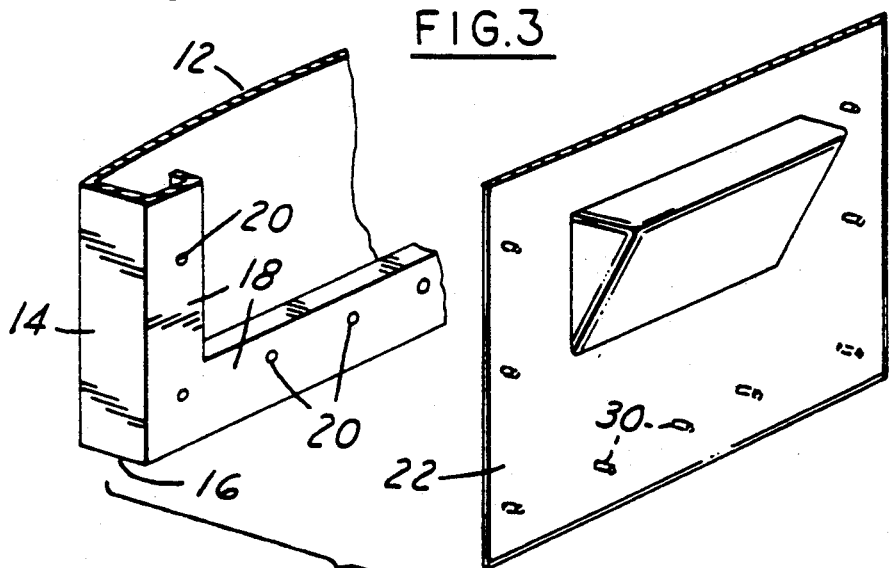
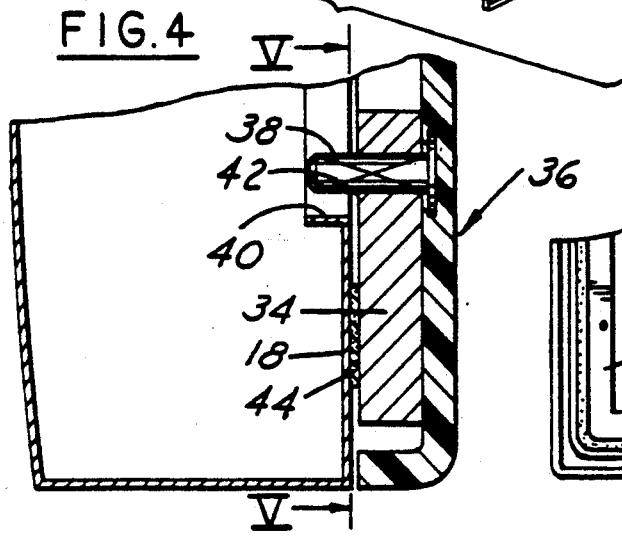
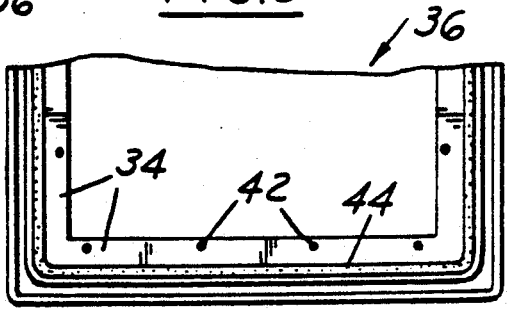

5,117,549

AUTOMOTIVE DOOR PANELS AND METHOD OF ASSEMBLY THEREFOR

This is a continuation, of application Ser. No. 312,483, filed on Feb. 21, 1989, now abandoned.

TECHNICAL FIELD

This invention relates generally to automotive door assemblies and, more particularly, to interior automotive door trim panels which are adapted to being automatically assembled to the outer metal door panel, primarily as a result of the fasteners being molded into place in the interior door panel.

BACKGROUND ART

While it is customary for an automotive door assembly to consist of an outer metal panel and a detachably mounted interior trim panel and a detachably mounted interior trim panel to provide access to the window mechanism intermediate the inner and outer panels, the interior trim panel has generally consisted of a backing panel of cardboard or fiber board with a cover of a suitable upholstery material, or an injected foam molded trim panel structure with the associated fasteners or studs being fixedly mounted on inner integral wall portions of the outer metal door panel.

As such, accurate locations of the fasteners relative to cooperating openings in the interior trim panel have presented some problems along the automotive assembly lines.

DISCLOSURE OF THE INVENTION

Accordingly, it is a general object of the invention to provide an improved automotive interior door trim panel assembly which is adapted to being automatically assembled to the usual outer metal door assembly.

Another object of the invention is to provide an interior door trim panel assembly wherein fasteners are integrally molded therein for cooperation with suitable openings formed in the outer metal panel assembly.

A further object of the invention is to provide an alternate interior door trim panel assembly wherein fasteners are integrally molded therein and mounted in openings formed in an adjacent bezel, eliminating the need for forming openings in the metal door panel assembly, the bezel being adhesively attachable to the metal door panel at final assembly.

A still further object of the invention is to provide a trim panel assembly wherein a bezel is detachably secured to three edge portions of an interior door trim panel by fasteners integrally molded in the trim panel, and wherein the bezel is adaptable to being adhesively secured to the metal door assembly along the vehicular assembly line, after which the interior trim panel and its integrally molded fasteners may be detached from the bezel to provide access to the window mechanism intermediate the inner and outer wall panels.

These and other objects and advantages will become more apparent when reference is made to the following drawings and accompanying description.

BRIEF DESCRIPTION OF THE DRAWINGS

FIG. 1 is a cross-sectional view of an automotive door assembly embodying the invention;

FIG. 2 is an enlarged, fragmentary cross-sectional view of a portion of the FIG. 1 structure;

FIG. 3 is an exploded perspective view of the outer and interior door panels embodying the invention;

FIG. 4 is an enlarged, fragmentary cross-sectional view similar to FIG. 2, illustrating an alternate embodiment of the invention; and FIG. 5 is a cross-sectional view taken along the plane of the line 5—5 of FIG. 4, and looking in the direction of the arrows.

BEST MODE FOR CARRYING OUT THE INVENTION

Referring now to the drawings in greater detail, FIGS. 1-3 illustrate a metal automotive door 10 having an outer wall 12, side and bottom wall portions 14 and 16, and inner flange portions 18. A plurality of spaced openings 20 are formed in the inner flange portions 18 (FIG. 3). A decorative interior door panel assembly 22 is molded either as one piece, as shown, or may consist of a backing plate, a vinyl skin shell, and an intermediate polyurethane foam (not shown).

A plurality of suitable fasteners 30 (FIG. 2) are integrally molded at predetermined spaced locations on the door panel assembly 22 such that they are on the same layout or pattern as the openings 20 in the inner flange portion 18 of the metal door 10. As such, the interior door panel assembly 22, and its integrally molded fasteners 30, may be automatically assembled to the metal door 10 along the assembly line by the automobile manufacturer, either before or after the metal door 10 is assembled to the automobile door frame (not shown).

Such assembly of the panel assembly 22 to the metal door 10 requires only a single pushing motion to simultaneously engage each of the fasteners 30 to a respective opening 20 once the assembly 22 is aligned along side the metal door 10, as indicated in FIG. 3.

After the original installation, the panel assembly 22 and its fasteners 30 may be easily removed from the metal door 10, in the field and reassembled thereto, should such action be necessary.

As an alternative to the above, a three-sided bezel 34 (FIGS. 4 and 5) is mounted on the interior door panel assembly 36 by the door panel supplier, and secured thereto by fasteners 38. As in the FIGS. 1 and 2 embodiments, the fasteners 38 are integrally molded to the assembly 22. The bezel 34 is of such a width as to extend a predetermined distance radially inwardly of the inner edge 40 of the flange portion 18 of the metal door 10. A plurality of spaced openings 42 are formed in the bezel 34 in the inwardly extended portion thereof to receive the fasteners 38.

For this arrangement, a bead of adhesive, represented at 44 in FIG. 4, is applied to the bezel 34 at final assembly, and then pushed into place against the inner flange portion 18 of the metal door 10. As such, the interior door panel assembly 36 and the bezel 34 are adaptable to being automatically assembled to the metal door 10 along the original automotive assembly line by a single pushing motion. Thereafter, the interior door panel assembly 36 and the fasteners 38 are readily removable from the bezel 34 in the field, and easily resembled thereto.

INDUSTRIAL APPLICABILITY

It should be apparent that the invention provides an outer metal door and interior door panel arrangement for an automobile, wherein the interior panel assembly may be readily and easily automatically assembled to the outer door assembly, by virtue of integrally molding suitable fasteners to the interior panel assembly. The fasteners cooperate with predetermined openings formed in either the outer door assembly or in a bezel. In either case, automatic assembly of the interior door panel assembly to the outer metal door is possible.

While but two embodiments of the invention have been shown and described, other modifications thereof are possible within the scope of the following claims.

The embodiments of the invention is which an exclusive property or privilege is claimed are defined as follows:

1. A method of assembly of an interior door panel assembly with an outer edge to an outer automotive metal door assembly having an inner portion including two spaced side portions and a bottom wall portion, said method comprising the steps of:
   a) integrally molding fasteners in said interior door panel assembly around the outer edge thereof;
   b) providing an integral inboard mounting flange on the metal door assembly;
   c) providing a bezel formed to be in a position substantially perpendicular to the side and bottom wall portions of said metal door assembly and extending across the full length of both said side and bottom wall portions; providing openings on the bezel as a plurality of spaced openings formed therein and fastening said interior door panel assembly on said bezel by inserting said fasteners through said spaced openings for connection of said bezel with said fasteners;
   d) applying a bead of adhesive on said bezel outwardly of said plurality of spaced openings;
   e) automatically aligning and urging said interior door panel assembly and the associated bezel into said position and into contact with outer metal door assembly thereby placing the bead of adhesive in contact with the outer metal door assembly and placing the ends of the fasteners inboard of the mounting flange, whereby the interior door panel can be replaced by separating the fasteners from the bezel while the bezel remains adhered to the mounting flange.

* * * * *